Patented Aug. 9, 1949

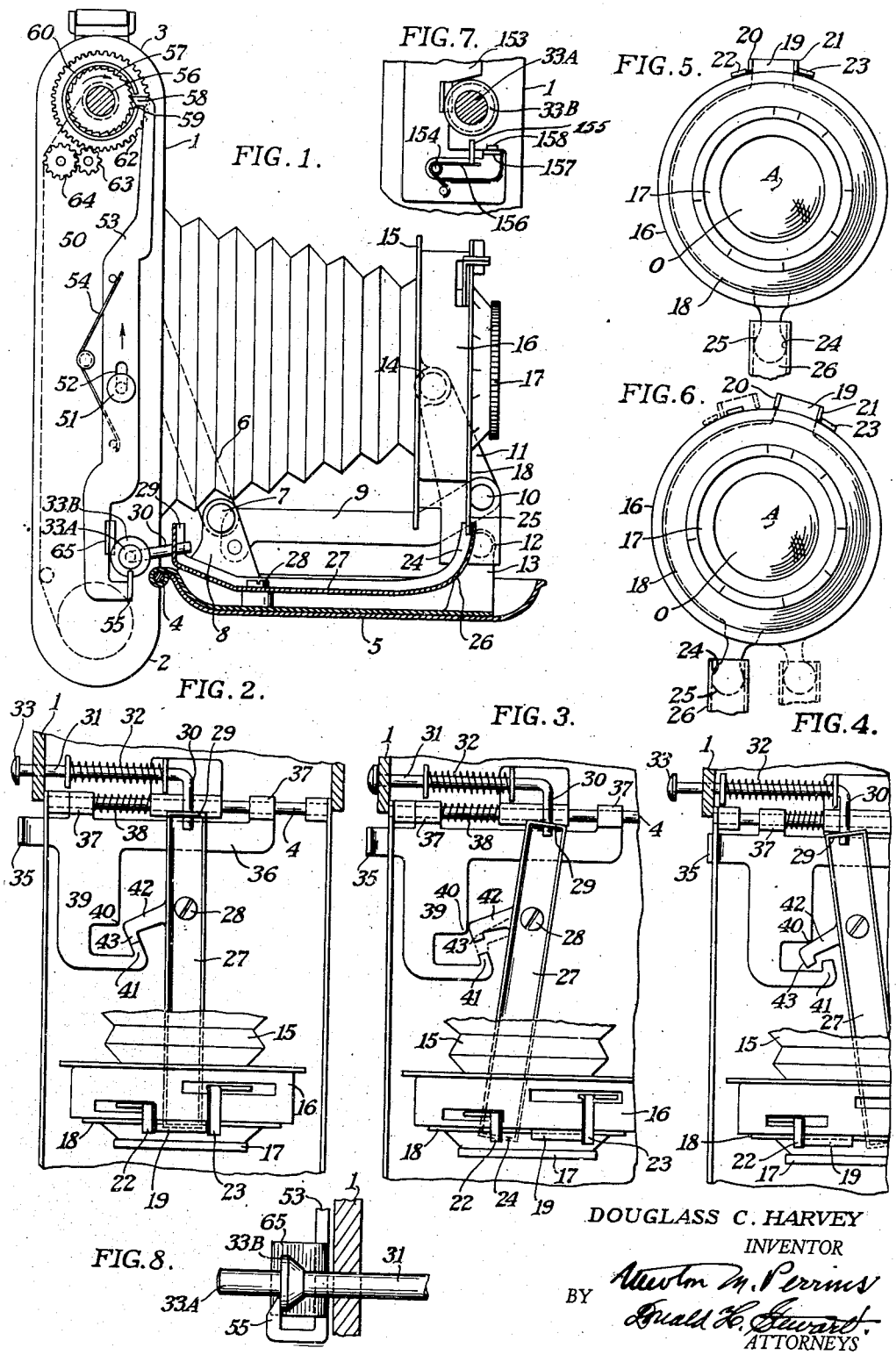

2,478,394

UNITED STATES PATENT OFFICE 2,478,394

CAMERA HAVING SHUTTER CONTROL AND FILM WINDING INTERLOCK

Douglass C. Harvey, Rochester, N. Y., assignor to Eastman Kodak Company, Rochester, N. Y., a corporation of New Jersey Application September 14, 1946, Serial No. 697,115

7 Claims. (Cl. 95—31)

This invention relates to photography and more particularly to photographic cameras having special controls to facilitate the proper operation of the various parts. One object of my invention is to provide a camera with a mechanism for setting and releasing the shutter arranged side-by-side in a convenient location for use. Another object of my invention is to provide a shutter-tripping lever which may lie in an operative position only when the shutter has been set. Another object of my invention is to provide a shutter-setting and releasing mechanism which is interlocked to a film-winding mechanism to correlate the setting of the shutter with positioning a fresh film for exposure. A still further object of my invention is to provide a camera control mechanism, particularly including a shutter-setting and tripping mechanism, which can be readily operated with the camera held at eye level, and other objects will appear from the following specification, the novel features being particularly pointed out in the claims at the end thereof.

With the modern type of direct view finders, it is customary to hold the camera at eye elevation to take pictures, and this is generally desirable because it gives a natural perspective. On the other hand, with most cameras, such as folding cameras, where the lens and shutter are mounted on the end of a bed, it is usually necessary to move the camera and shutter into a convenient position for setting the shutter, after which the shutter may be released after again raising the camera to eye level. The shutter release may be mounted on the camera body. It is generally not convenient to both set and release a shutter when the camera is held in an operative eye-level position. In the present embodiment of my invention, I prefer to provide a controlling lever which cooperates with the film-winding mechanism and which, at the same time, cooperates with the shutter-setting mechanism to produce a structure which reduces, if not entirely eliminates, double exposure, and adds greatly to the convenience of shutter operation.

Coming now to the drawings wherein like reference characters denote like parts throughout:

Fig. 1 is a side elevation, parts being shown in section, of a camera having a control mechanism constructed in accordance with and embodying a preferred form of my invention. A housing on the side wall of the camera has been removed to expose parts of the mechanism;

Fig. 2 is a top plan view of a portion of the camera bed and operating mechanism, parts being shown in section, the parts also being shown in a normal position after setting in a camera, embodying a slightly different form of my invention, is in condition for an exposure;

Fig. 3 is a view much like Fig. 2 but with the setting lever shown in a depressed position which occurs at the moment the shutter is being set;

Fig. 4 is a fragmentary detail, similar to the preceding views, but with the shutter release depressed for actuating the shutter after it has been set;

Fig. 5 is a fragmentary front view showing the relationship of the lever encircling the shutter to the shutter trigger and shutter-setting lever, the parts being shown in a normal position of rest;

Fig. 6 is a view similar to Fig. 5, but with the parts shown in the position they assume just as the shutter is set, as this would occur when the setting lever is depressed, as in Fig. 3;

Fig. 7 is a fragmentary detail of a modification of the side wall lever shown in Fig. 1; and Fig. 8 is an enlarged fragmentary detail front elevation of the shutter setting member and associated parts.

My invention broadly consists in providing a shutter with a ring movable about the axis of the objective in one direction for setting the shutter, and in an opposite direction for releasing the shutter; the ring being operated by a lever pivotally mounted on the camera bed. A shutter release member slidable along the bed hinge, and a shutter-setting member slidable along the camera body, are arranged adjacent to each other in a convenient position for operation of these parts when the camera is held at eye level.

More specifically, my invention may be embodied in a camera having a body 1 and having rounded ends 2 and 3 forming the outer walls of supply and take-up spool chambers. The camera body carries a hinge 4 to which a camera bed 5 is attached for movement to and from an open, or picture-taking, position, as shown in Fig. 1. The camera may be supported by the usual type of bed braces 6 pivoted at 7 to the bed brackets 8, these brackets also supporting erecting links 9, pivoted at 10 to the lens board links 11. The links 11 are pivoted at 12 to the brackets 13 carried by the camera bed and are pivoted at 14 to a lens board 15. This lens board supports the shutter 16 which, in this instance, is shown as having a focusing front lens element mounted in the movable cell 17. As thus far described, the construction is well known in folding cameras.

My invention includes mounting a ring-like member 18 to turn on the shutter 16 about the axis A of the shutter and the objective O. This ring carries an upper forwardly-extending arm 19 having spaced flanges 20 and 21. Flange 20 lies adjacent the shutter trigger 22 and flange 21 lies adjacent the shutter-setting lever 23 normally substantially filling the space between these two levers. When the ring member 18 is moved in a clockwise direction, with reference to Fig. 5, lug 21 will contact with the setting lever 23, and by moving the setting lever 23 from its Fig. 5 to its Fig. 6 position, will set the shutter. When the shutter is set, the ring 18 will return to its normal position in Fig. 5 and the parts will be in the position shown in Fig. 2, which is a normal position of rest, ready for an exposure.

The ring 18 also includes a downwardly-extending arm 24 which is engaged between flanges 25 on the turned-up end 26 of a channel-shaped lever 27 pivoted at 28 to the camera bed 5. The opposite end 29 of this lever is turned up and a pin 30, carried by or forming a part of a setting lever 31 slidably mounted on the camera body 1, is provided to move the lever 27 to set the shutter. A spring 32 normally holds an operating button 33 outwardly as shown in Fig. 2, and the spring 32 may be heavy enough (if this should be desired) to move the lever 27 in a counter-clockwise direction about its pivot 28 to actuate the shutter. However, I generally prefer to provide a separate shutter-actuating finger piece 35 and in this instance the finger piece 35 is carried by a lever 36 having hinge elements 37 encircling the hinge pin 4 of the camera to slide thereon. I prefer to provide a spring 38 for normally holding the finger piece 35 outwardly and in an operative position. It might be noted here that the finger pieces 33 and 35 are mounted adjacent each other in a convenient position for operation by the first two fingers of an operator's hand, since the finger pieces are parallel and close to the hinge of the camera, as indicated.

The lever, or slide, 36 may move upon the camera hinge pin 4 and this member contains an offset arm 39 which includes a shoulder 40 and a bent finger 41. The object of the shoulder 40 is to trip the shutter through engagement with the offset arm 42 having a hook-like end 43. One object of the hook 41 is to form a stop for holding lever 27 in a normal position of rest, as indicated in Fig. 2. In this position the end 43 of offset arm 42 rests on the end of hook 41. The arm 42 is integrally formed with, or attached to, the lever 27 and turns with the lever, as the lever moves about the pivot 28. When the parts are in the Fig. 2 position, after the shutter has been set, if an exposure is to be made the finger piece 35 is depressed, this depression causing the shoulder 40 to engage the lever 42, as best shown in Fig. 4, camming the lever in a counter-clockwise direction. Since the lever 27 moves in a counter-clockwise direction, it moves from the position shown in Fig. 2 to the position shown in Fig. 4, thus rocking the ring 18 in a counter-clockwise direction and causing the lug 20 to engage the shutter trigger 22, moving it from the position shown in full lines to the broken-line position of Fig. 6. This movement of the trigger will actuate the shutter, but after actuation, if the finger piece 35 is released, it may not return to its Fig. 2 position because of the engagement of the hooks 41 and 43. This can readily be visualized from Fig. 4 which shows the hook-like members only slightly past their engaging position. If, now, an attempt should be made to again depress the release 35, this could not be done. It is, therefore, necessary to set the shutter and wind the film before the trigger will be released to return to its normal position. Setting the shutter can readily be done by depressing the finger piece 33, thereby rocking the lever 27 in a clockwise direction, releasing the hooks 41 and 43, as the arm 42 moves to its Fig. 3 position during the setting movement.

The shutter-tripping and setting members, as above described, are very useful without being in any way interconnected with the film-winding mechanism, since they provide an extremely convenient way of setting and releasing the shutter from adjacent finger pieces which can readily be operated by the first two fingers. However, the structure can work very conveniently in conjunction with a film-winding device, so that the chances of making a double exposure will be greatly reduced, or entirely eliminated. To accomplish this, I provide a structure similar in many respects to the film-winding structure and double exposure prevention device shown in U. S. Pat. No. 2,218,241, Hughey, granted October 15, 1940. In this patent there is a pivoted lever having one end positioned to engage either a ratchet wheel or a flange mounted to move with film-winding mechanism, the opposite end of the lever being adapted to engage the shutter trigger.

In the present invention I use a similar shaped lever engageable with film-winding mechanism, but the opposite end of the lever does not engage the shutter release member but engages the shutter-setting member.

As illustrated in Fig. 1, the wall 50 of the camera body 2 may carry a stud 51 which passes through a slot 52 in a lever 53 so that this lever may both turn on, and slide about, the stud 51. A spring 54 tends to move the lever in the direction shown by the arrow in Fig. 1 so as to bring an upturned lug 55 beneath the flange 33B of head 33A of the finger piece which is moved to set the shutter. This push button is of different form from push button 33 which, in Figs. 2 to 4 is shown as merely a rounded head, but in these figures the connections to the film wind are not employed. The modified push button is best shown in Fig. 8. When lug 55 lies above the finger piece flange 33B, the latter cannot move upwardly. If the finger piece 33A cannot be moved upwardly, it will prevent the operation of the shutter release 35 because of shoulders 40 and 43, Fig. 3, and will be immovable. An operator will therefor know that the next step to be required is winding the take-up film spool to present a fresh area of film into place. The operator will, therefore, turn a film-winding knob on the shaft 56 so as to turn this shaft in a clockwise direction, as shown by the arrow, Fig. 1. This movement, through the ratchet wheel 57, moves the lever 53 downwardly as permitted by the pin 51 in slot 52 of lever 53 until the lug 55 moves from above the fingerpiece 33. As this movement takes place, the lever 53 may slide upon the pivotal stud 51 and the pawl 58 remains in engagement with ratchet 57. But when 33A is depressed, flange 33B cams lever 53 clockwise through engagement with cam 65 on lever 53 removing the pawl from the ratchet and allowing spring 54 to move lever 53 until pawl 58 rides up on the edge of the slotted ring cam 60. This unlocks film wind.

When the lug 55 has been removed from above the finger piece 33A, the pawl 58 engages an outer periphery of the ring 60 so that film winding is permitted until the notch 59 again reaches the pawl, at which time the ratchet 58 drops through and engages the ratchet wheel 57, thereby stopping the winding movement when lever 53 slides on stud 51 until stopped by the end of the slot. This also tensions spring 54. The ratio of gears 62, 63, and 64 is such that the gear 62 turns substantially once for each fresh area of film being wound into place. When the pawl 58 drops through the notch 59 and engages a ratchet tooth 57, the lever moves to position the hook 55 in the path of button 33A. Since the cam face 65 lies adjacent the finger piece flange 33B when this finger piece can be depressed, it moves lever 53 clockwise about stud 51.

The depression of the finger piece 33A, of course, sets the shutter, as pointed out above, and after being released, the spring 32 will return the parts to the Fig. 2 position. An exposure can now be made by depressing the finger piece 35 although, as above pointed out, if spring 32 is made sufficiently heavy, the shutter may be released merely by allowing the push button 33 to move outwardly under the impulse of its spring. However, I prefer to utilize a separate shutter release member 35, as fully described above.

Fig. 7 shows a modified form of my invention in that a different form of shutter setting lock is employed. Lever 153 is the same as lever 53 of the above-described embodiment and this lever may turn and slide on a stud 51. However, latch 155 is pivoted upon a pin 154 and normally held by a spring 156 to engage lug 157 with lug 158 on lever 153. Latch 155 may engage shoulder 33B of the shutter setting knob 157 which may be carried by slide 31. The function is the same as that of latch 55 and setting knob 33 but by separately pivoting latch 155 the latch can be made to function with less difficulty than with the fixed lug 55 as the latter requires some accuracy in the tolerances permissible with lever 53.

With both forms of my invention the operator soon learns that he must follow a normal sequence of operations which are (1) set shutter, (2) wind film, and (3) trip shutter. If an effort is made to trip the shutter, this cannot be done unless film has been wound. It is not possible to wind two areas of film without operating the shutter setting lever.

With the described structure, if the lever 53 is included, it is impossible to wind a fresh area of film into place without setting the shutter, and it is impossible to depress the shutter release unless the shutter has been set so that it is necessary for an operator to go through the proper cycle of movement before making an exposure. If the turned-up lug 55 lies over the shutter-setting finger piece 33A, the operator cannot set the shutter. He, therefore, realizes that the next operation is winding a fresh area of film into place. The act of winding a film into place removes the lug 55 from beneath the button 33 and permits the cam 65 to lie in a position to be moved by the finger piece 33 when this finger piece is depressed. After the film has been wound, the finger piece 33 on the rod 31 moves outwardly to its operative position and the release 35 may be depressed so that the shoulder 40, through contact with the arm 42, may cam the lever 27 in a clockwise direction, as indicated in Fig. 4, to release the shutter trigger. The trigger will be again latched down and the finger piece 33A will be in its uppermost position ready for setting the shutter so that a film may be wound. The trigger 35 is latched against movement until the film is wound and the hook 55 displaced by lever 53, pawl 58, and notch 59, or ring 60 occurring at the end of the film-winding movement.

I claim:
1. A camera of the type including a camera body, an exposure frame thereon, a bed movably mounted thereon, a lens and shutter of the setting type carried thereby, the combination with said shutter, of a lever movable to set and trip the shutter mounted on the shutter, a bed lever, operable connections between the bed lever and the lever for setting and tripping the camera shutter, a pair of movably mounted operating members, one for setting and the other for tripping the shutter through the bed lever and the lever for setting and tripping the shutter, an interlock between the pair of operating members including an offset arm on the bed lever having a hook shape and a bent finger on the operating member for tripping the shutter mounted for movement relative to each other and into and out of engagement, whereby said operating member for tripping the shutter may be held against movement by the interengaging bent finger and hook, and means for releasing said interengagement by moving the other operating member for setting the shutter, a film winding mechanism carried by the camera for moving a film relative to the exposure frame, an interlock lever movably mounted on the camera and extending from the film winding mechanism to the operating member for setting the shutter, and means carried by said interlock lever for latching the shutter setting member when in one position to prevent the operation thereof.

2. A camera of the type including a camera body, an exposure frame carried thereby, a bed movably mounted thereon, a lens and shutter of the setting type carried thereby, the combination with said shutter, of a lever movable about the shutter to set and trip the shutter, a pivoted bed lever, operable connections between the bed lever and the lever for setting and tripping the camera shutter for moving the former by the latter, a pair of movably mounted operating members, one for setting and the other for tripping the shutter through the bed lever and the lever for setting and tripping the shutter, an interlock between the pair of operating members including an offset arm on the bed lever having a hook shape and a bent finger on the operating member for tripping the shutter, movable relative to each other and into and out of engagement whereby said operating member for tripping the shutter may be held against movement by the interengaging bent finger and hook, and means for releasing said interengagement by moving the other operating member for setting the shutter, a film winding mechanism carried by the camera spaced from the operating members for moving film relative to the exposure frame, an interlock lever movably mounted on the camera and extending from the film winding mechanism to the operating member for setting the shutter, and means carried by said interlock lever for latching the shutter setting member when in one position to prevent further operation thereof, and a cam on the interlock lever for moving the latter by the shutter setting member.

3. A camera of the type including a camera body including an exposure frame, a bed movably mounted thereon, a lens and shutter of the setting type carried thereby, the combination with said shutter, of a lever having an arm movable about the shutter to set and trip the shutter, a pivoted bed lever, operable connections between the bed lever and the lever for setting and tripping the camera shutter for moving the levers together, a pair of movably mounted operating members, one for setting and the other for tripping the shutter through the bed lever and the lever movable about the shutter, operable connections between the bed lever and the lever for setting and tripping the camera shutter, a pair of slidably mounted operating members, one for setting and the other for tripping the shutter through the bed lever and the lever for setting and tripping the shutter, an interlock between the pair of operating members including an offset arm on the bed lever having a hook shape and a bent finger on the operating member for tripping the shutter, movable relative to each other and to and from contact with each other whereby said operating member for tripping the shutter may be held against movement by the interengaging bent finger and hook, and means for releasing said interengagement by moving the other operating member for setting the shutter, a film winding mechanism carried by the camera for moving film relative to the exposure frame, an interlock lever movably mounted on the camera to turn and slide and extending from the film winding mechanism to the operating member for setting the shutter, and means carried by said interlock lever for latching the shutter setting member when in one position to prevent the operation thereof, and a cam on the interlock lever for moving the latter by the shutter setting member, a ratchet included in the film winding mechanism, a pawl adapted to engage the ratchet carried by the interlock lever adapted to be moved from the ratchet by movement of the lever cam by the shutter setting member.

4. A camera of the type including a camera body, an exposure frame thereon, a bed movably mounted thereon, a lens and shutter of the setting type carried thereby, the combination with said shutter, of a lever movable to set and trip the shutter, a bed lever, operable connections for connecting the bed lever and the lever for setting and tripping the camera shutter for movement together, a pair of slidably mounted operating members, one for setting and the other for tripping the shutter through the bed lever and the lever for setting and tripping the shutter, an interlock between the pair of operating members including an offset arm on the bed lever having a hook shape and a bent finger on the cooperating member, said hook and bent finger being movable relative to each other and positioned for contact with each other for tripping the shutter, whereby said operating member for tripping the shutter may be held against movement by the interengaging bent finger and hook, and means for releasing said interengagement by moving the other operating member for setting the shutter, separate means for moving a film to the exposure frame, and a latch mounted on the camera and engageable with the shutter setting operating member for holding the latter against movement when depressed.

5. A camera as defined in claim 4 characterized in that the separate means for moving a film to the exposure frame includes a film-winding device, and means operable by the film-winding device for releasing said latch.

6. A camera defined in claim 4 characterized in that the separate means for moving a film to the exposure frame includes a film-winding device, and means operable by the film-winding device for releasing said latch, and separate springs for the two manually operable members for setting and tripping the shutter positioned for normally holding each of these members outwardly, and in an operating position.

7. A camera as defined in claim 4, characterized in that the separate means for moving a film to the exposure frame includes a film-winding device, and means operable by the film-winding device for releasing said latch, the operating member for setting the shutter having a permanent connection with the bed lever.

DOUGLASS C. HARVEY.

REFERENCES CITED

The following references are of record in the file of this patent:

UNITED STATES PATENTS

| Number | Name | Date |
| --- | --- | --- |
| 2,126,340 | Nagel | Aug. 9, 1938 |
| 2,218,241 | Hughey | Oct. 15, 1940 |
| 2,231,731 | Mihalyi | Feb. 11, 1941 |
| 2,237,887 | Nerwin | Apr. 8, 1941 |
| 2,335,439 | Nerwin | Nov. 30, 1943 |